United States Patent [19]

Setani

[11] Patent Number: 5,177,349
[45] Date of Patent: Jan. 5, 1993

[54] IMAGE READING APPARATUS UTILIZING A FOUR STEP OR MORE STAIRCASE DIFFRACTION GRATING STRUCTURE

[75] Inventor: Michitaka Setani, Kawasaki, Japan

[73] Assignee: Canon Kabushiki Kaisha, Tokyo, Japan

[21] Appl. No.: 697,589

[22] Filed: May 9, 1991

[30] Foreign Application Priority Data

May 15, 1990 [JP] Japan .................. 2-125939

[51] Int. Cl.⁵ ............................ H01J 40/14
[52] U.S. Cl. ........................ 250/208.1; 359/565
[58] Field of Search ............. 250/208.1; 359/571, 359/618, 565, 569; 356/305, 326, 328, 334

[56] References Cited

U.S. PATENT DOCUMENTS

| | | | |
|---|---|---|---|
| 4,079,411 | 3/1978 | Engelbrecht et al. | 359/575 |
| 4,277,138 | 7/1981 | Dammann | 350/162 R |
| 4,679,901 | 7/1987 | Dammann et al. | 359/571 |
| 4,882,619 | 11/1989 | Hasegawa et al. | 359/615 |
| 4,963,464 | 10/1990 | Setani | 430/495 |
| 4,991,030 | 2/1991 | Sato et al. | 358/474 |

FOREIGN PATENT DOCUMENTS 383307 8/1990 European Pat. Off.
2645075 11/1978 Fed. Rep. of Germany.

OTHER PUBLICATIONS

H. Dammann, *Applied Optics*, "Color Separation Gratings", vol. 17, No. 15, Aug. 1, 1978, pp. 2273–2279.

Primary Examiner—David C. Nelms
Assistant Examiner—T. Davenport
Attorney, Agent, or Firm—Fitzpatrick, Cella, Harper & Scinto

[57] ABSTRACT

An image reading apparatus comprises a plural-line sensor comprising a plurality of one-dimensional sensor arrays disposed on one and the same substrate, an imaging optical system for imaging an object on the sensor, and a brazed diffraction grating disposed in the optical path between the imaging optical system and the sensor for color-resolving a light beam from the object into a plurality of lights and directing the color-resolved lights to the sensor arrays corresponding thereto, the number of steps of the staircase structure of the diffraction grating being four or more.

18 Claims, 8 Drawing Sheets

SUB-SCANNING SECTION

SUB-SCANNING SECTION

IMAGE READING APPARATUS UTILIZING A FOUR STEP OR MORE STAIRCASE DIFFRACTION GRATING STRUCTURE

BACKGROUND AND SUMMARY OF THE INVENTION

This invention relates to an apparatus for reading color images by the use of a solid state image pickup device or the like, and more particularly to a color image reading apparatus for color-resolving and separating light from an object through an imaging optical system and color resolving means and directing the separated lights to sensors such as solid state image pickup devices.

An apparatus as shown in FIG. 1 of the accompanying drawings is known as an apparatus for line-scanning an object such as an original in the sub-scanning direction and color-reading the image thereof by a solid state image pickup device (such as CCD sensor) array. In FIG. 1, information light on a part of the surface 1 of an original irradiated with light from an illuminating light source (not shown) is resolved and separated into three colors by a three-piece (3P) prism 20 through an imaging optical system 19, whereafter the three color lights are imaged on three one-line CCD sensors 21, 22 and 23 and read.

However, in the above-described example of the prior art, three one-line sensors are independently necessary and usually, high accuracy of manufacture is required of the 3P prism 20, and this leads to high costs. Further, adjustment is independently necessary for the condensed light beam and each of the three sensors 21, 22 and 23, and this also has led to the disadvantage that the degree of difficulty of manufacture is high.

So, it would occur to mind to make three lines of sensor arrays on one and the same substrate in parallelism to one another with finite distances therebetween, and form three lines on an element as a monolithic three-line sensor.

Such a three-line sensor 24 is shown in FIG. 2 of the accompanying drawings. In FIG. 2, the distances $S_1$ and $S_2$ between three lines 25, 26 and 27 and are of the order of 0.1–0.2 mm from various manufacturing conditions, and the picture element widths $W_1$ and $W_2$ of each single element 28 are of the order of 7 $\mu$m $\times$ 7 $\mu$m and 10 $\mu$m $\times$ 10 $\mu$m.

A construction known as a color image reading apparatus using such a monolithic three-line sensor as a light receiving element is shown in FIG. 3 of the accompanying drawings.

In FIG. 3, when line-scanning the information on the surface 1 of the original in the sub-scanning direction and reading it, the light from the surface 1 of the original is resolved and separated into three light beams of three colors by color-resolving beam splitters 30 and 31 having selective transmission film of bicolor property added thereto, through an imaging optical system 29, whereafter the three light beams are condensed on respective corresponding line elements on a monolithic three-line sensor 32. As shown in FIG. 3, however, when the plate thickness of the beam splitters 30 and 31 is X, the inter-line distance on the sensor 32 is $2\sqrt{2}\cdot X$, and when as previously described, the inter-line distance ($2\sqrt{2}\cdot X$) is set to the order of 0.1–0.2 mm, the plate thickness (X) is of the order of 35–70 $\mu$m. This numerical value is not an easy value to obtain in manufacture when the degree of flatness of the surface required in performance is considered.

On the other hand, generally speaking, the distances of the other two lines 25 and 27 to the central line 26 of the monolithic three-line sensor are usually equal in each of opposite directions and integer times as great as the picture element size ($W_2$ in FIG. 2) in the sub-scanning direction.

This is for the following reason. As can be seen from FIG. 4 of the accompanying drawings, where an image is read by the above-described monolithic three-line sensor by the use of only an ordinary imaging optical system 45, the positions on the surface of the original, which are read at a time by the three lines 25, 26 and 27, are three different positions 25', 26' and 27' as shown in FIG. 4. Therefore, the signal components of three colors (R, G and B) relative to a certain position on the surface of the original are not read at the same time and thus, it is necessary to make them coincident with one another and combine them together after they are read.

For this purpose, the inter-line distances $S_1$ and $S_2$ are made integer times as great as the size $W_2$ of each picture element and a redundant line memory conforming thereto is provided, and then G and R signals are delayed with respect, for example, to B signals, whereby a combined signal of three colors is obtained relatively easily. For this reason, the inter-line distances $S_1$ and $S_2$ are made integer times as great as the size $W_2$, as described above. However, this means the provision of plural lines of expensive line memories to allot a redundant line memory to the inter-line distance, and this is very disadvantageous with respect to cost, and is far from providing an inexpensive color image reading apparatus.

Also, a color image reading apparatus using a brazed diffraction grating as color resolving means is known from U.S. Pat. No. 4,277,138 (corresponding DE 2645075).

However, in the construction disclosed in the above-mentioned publication, consideration is paid only to the light from a point on an object, and not to the so-called angle-of-field characteristic attributable to a finite reading width in the main scanning direction being present on the surface of the object.

Accordingly, it is an object of the present invention to provide an inexpensive and high-performance color image reading apparatus in view of the above-noted problems.

According to the present invention, in a line scan type color image reading apparatus having, for example, a monolithic three-line sensor in which one-dimensional sensor arrays, such as solid state image pickup devices, are disposed on one and the same substrate over three lines with finite distances therebetween in a direction perpendicular to the direction of the arrays and an imaging optical system for forming the image of an object on the sensors, there is achieved an inexpensive and high-performance line scan type color digital image reading apparatus. In the present invention a one-dimensional brazed diffraction grating for spectrally separating the light from the object by the diffraction effect and color-resolving the light into three colors in the direction perpendicular to the arrays and directing said color-resolved lights to the respective corresponding sensor arrays, is disposed in the optical path between said imaging optical path and said sensors. The number of steps of the diffraction grating having the staircase structure of said one-dimensional brazed diffraction grating is not limited to where three steps are necessary to efficiently divide the light into three colors, but is increased to four or more steps, whereby interference noise light, which is spectral sideband light, is prevented from mixing with each spectral color and good three-color spectral reading is made possible without respective wavelength selective filter characteristics (R, G and B) on the surfaces of the three-line sensors, which are usually set.

DESCRIPTION OF THE PREFERRED EMBODIMENTS

Figure 1:
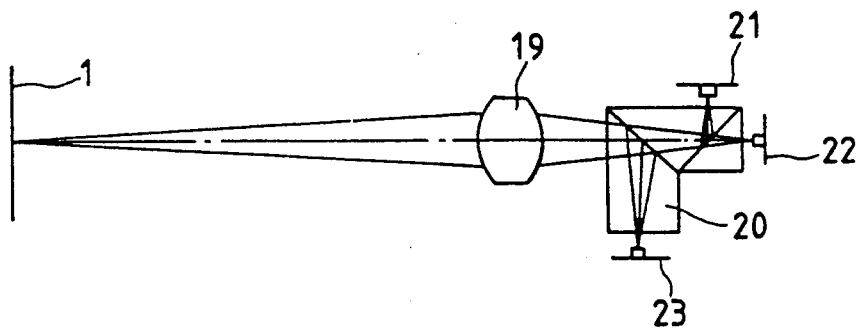
FIGS. 1, 3 and 4 are schematic cross-sectional views illustrating an example of the prior art.
Figure 2:
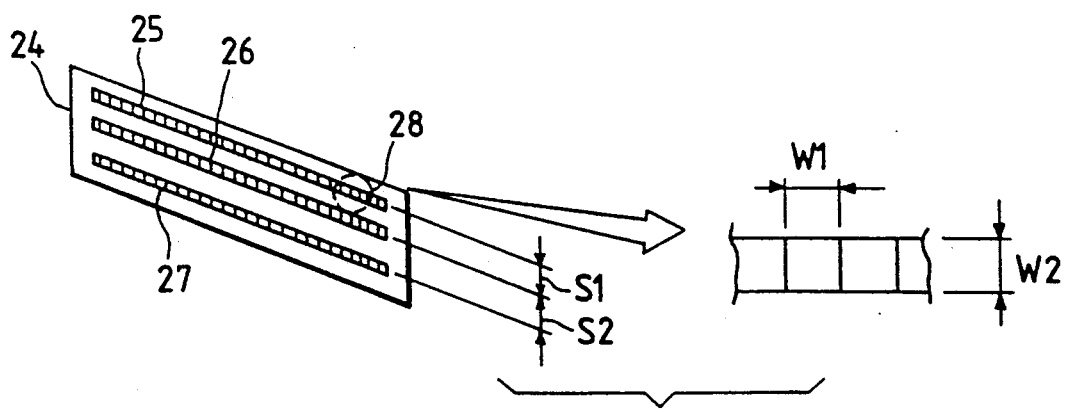
FIG. 2 illustrates the construction of a monolithic three-line sensor.
Figure 3:
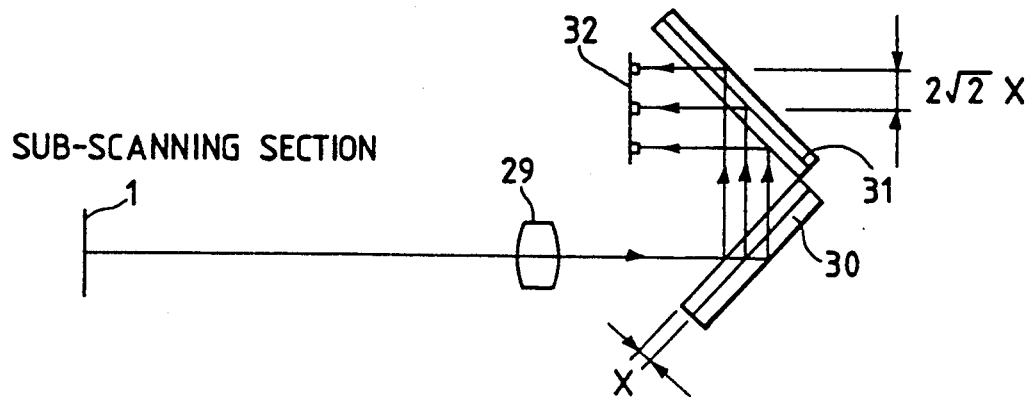
Figure 4:
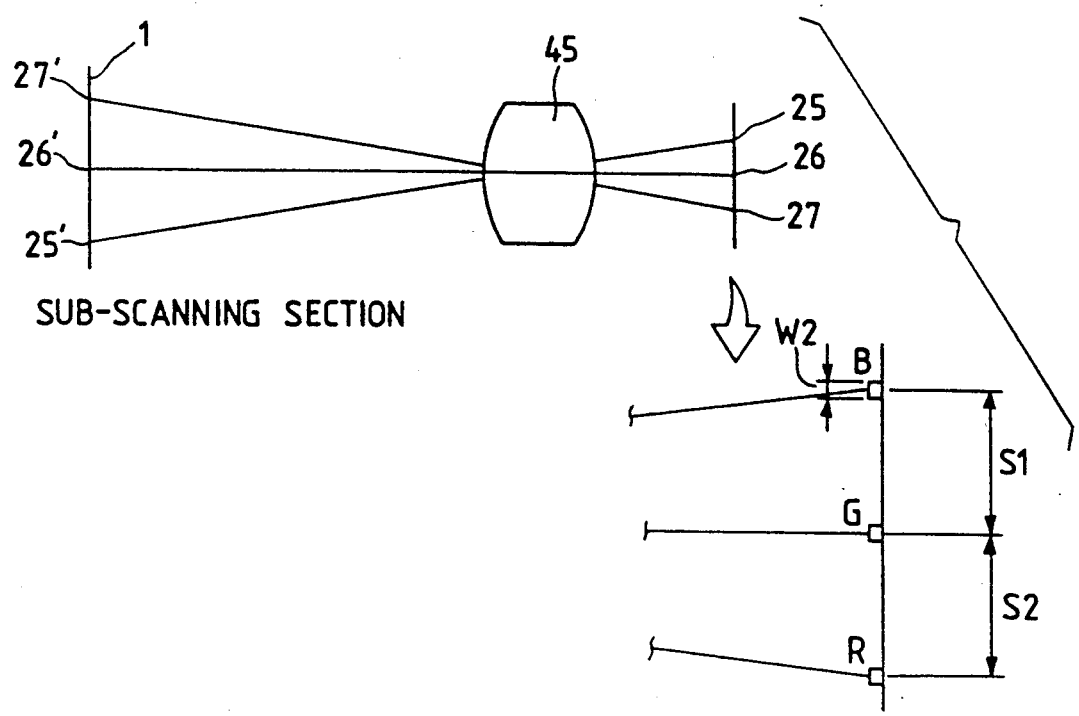
Figure 5A:
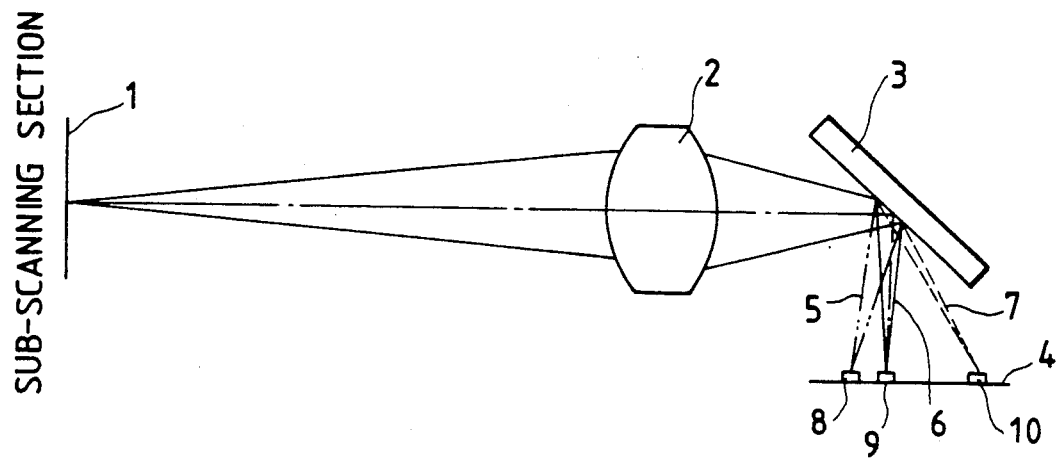
FIGS. 5A and 5B are schematic cross-sectional views for illustrating a first embodiment of the color image reading apparatus of the present invention.
Figure 5B:
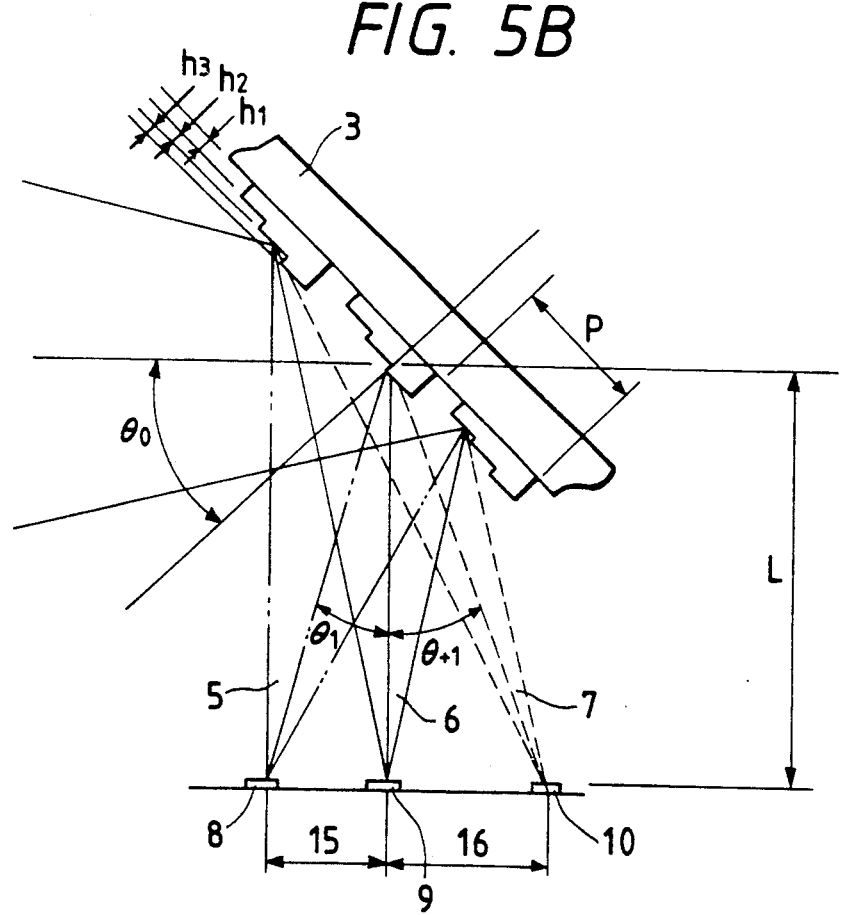

FIGS. 5A and 5B show a first embodiment of the color image reading apparatus of the present invention. FIG. 5B is a partial enlarged view of the apparatus of FIG. 5A. In FIGS. 5A and 5B, the surface 1 of an original, which is an object, is illuminated by illuminating means (not shown), the image information of the surface 1 of the original is line-scanned in the sub-scanning direction (the vertical direction in the plane of the drawing sheet of FIG. 5A) by a mirror (not shown) or the like disposed between the original and an imaging optical system 2, and the image information light is directed to a color resolving reflection type one-dimensional brazed diffraction grating 3 of four-step structure through the imaging optical system 2. That is, the surface 1 of the original and the image reading apparatus (the imaging optical system 2, the one-dimensional brazed diffraction grating 3 and a sensor 4) are moved relative to each other in the sub-scanning direction, whereby the image information of the surface 1 of the original is read.

The information light is spectrally separated into light beams 5, 6 and 7 of three colors (e.g. R, G and B) in the so-called color reading in the horizontal direction by reflection and diffraction, whereafter the light beams 5, 6 and 7 are imaged on line sensor arrays, i.e., line sensors 8, 9 and 10, on the monolithic three-line sensor 4 having three line sensors disposed parallel to one another on one and the same substrate. Also, the one-dimensional brazed diffraction grating 3 is disposed in the optical path between the imaging optical system 2 and the three-line sensor 4 and is more adjacent to the three-line sensor 4 than to the exit pupil of the imaging optical system 2. In this embodiment, it is to be understood that the reference numeral 5 designates −1st-order diffracted light corresponding to a B component, the reference numeral 6 denotes 0-order diffracted light corresponding to a G component, and the reference numeral 7 designates +1st-order diffracted light corresponding to a R component. The one-dimensional brazed diffraction grating for three-color division is shown in *Applied Optics*, Vol. 17, No. 15, pp. 2273-2279 (issued on Aug. 1, 1978), and the grating shown therein has staircase structure.

Each of the line sensors 8, 9 and 10 on the sensor 4 extends in the main scanning direction (the direction perpendicular to the plane of the drawing sheet of FIG. 5A). The sensor 4 is a plural-line sensor having a plurality of one-dimensional sensor arrays disposed on one and the same substrate, and this plural-line sensor is a monolithic three-line sensor in which one-dimensional sensor arrays are disposed on three lines with finite distances therebetween in a direction orthogonal to the array direction of the sensor arrays.

Also, the one-dimensional brazed diffraction grating color-resolves the light from the object into a plurality of lights in the sub-scanning direction, which is a direction orthogonal to the array direction.

Figure 6A:
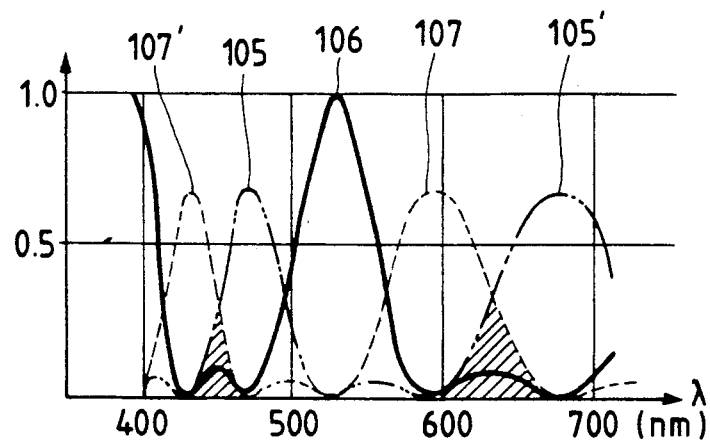
FIGS. 6A, 6B and 6C are spectral intensity distribution graphs illustrating the effect of the embodiment of the present invention.

Now, to spectrally separate light into three colors, a staircase structure of at least three steps is necessary. The spectral intensity in a three-step grating structure ($\theta_0 = 45°$, $h_1 = h_2 = 1113.7$ nm) wherein for example, the G component diffraction peak wavelength of 0-order diffracted light is 525 nm is shown in FIG. 6A. In the wavelength band in which the portions indicated by hatching in FIG. 6A, i.e., the vicinities of 450 nm and 630 nm, are median lines, the sideband wave component 107' of +1st-order diffracted light (R component) color-resolvingly mixes with −1st-order diffracted light (B component) 105, while the sideband wave component 105' of −1st-order diffracted light (B component) likewise mixes with +1st-order diffracted light (R component) 107, thus adversely affecting the color reproducibility of color reading. To eliminate such influence, wavelength selective filter characteristics having so-called B, G and R characteristics, as indicated by 108, 109 and 110 in FIG. 7, have been added to the line sensors 8, 9 and 10, which are light receiving elements. However, to add these filter characteristics uniformly and stably to a plurality of rows of elements, a difficult technique has been required and the number of steps in manufacture has been increased and the yield has also been greatly affected.

Also, generally, the addition of such filter characteristics has caused the absorption of light, which in turn has caused a reduction in the sensitivity of the sensors.

So, in the present embodiment, by providing four or more steps to the above-described staircase structure, I have invented a method of obviating the mixing of the sideband wave components of the above-mentioned diffracted lights during spectral diffraction and obtaining good color reproducibility even if the surfaces of the sensors do not have the wavelength selective filter characteristics thereon.

That is, the present invention is a color image reading apparatus in which the staircase structure of the one-dimensional brazed diffraction grating 3 is constructed of four or more steps, and no wavelength selective filter characteristic is added to the surfaces of the line sensors 8, 9 and 10 of the monolithic three-line sensor 4.

To provide four or more steps to said the staircase structure is to provide four or more stages to the height which provides a phase difference.

Figure 6B:
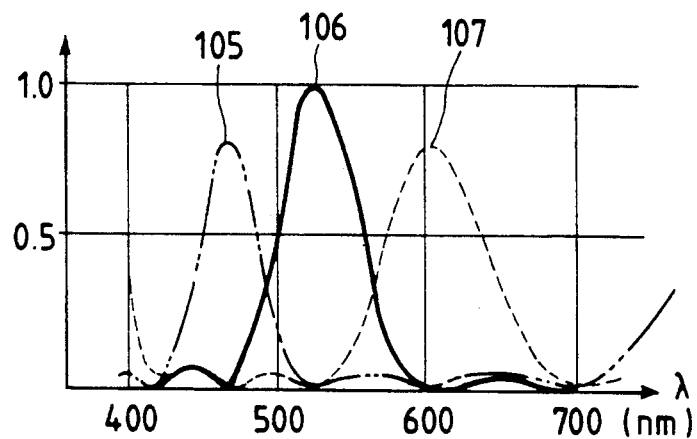
Figure 6C:
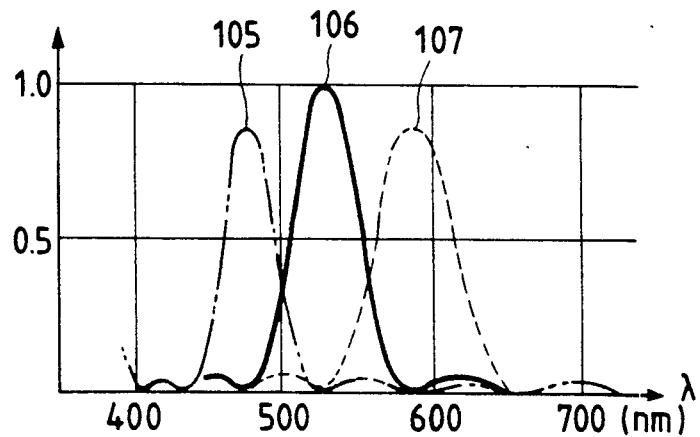

The spectral intensity in the four-step structure, which will hereinafter be described, is shown in FIG. 6B, and spectral intensity in the five-step structure, which will hereinafter be described, is shown in FIG. 6C. In both of these figures, it is shown that all of 0-order and ±1st-order diffracted light components become 0 in a certain wavelength, and it will be seen that there is basically no mixing of +1st-order sideband wave and −1st-order sideband wave with 1st-order diffracted light and +1st-order diffracted light, respectively, in the above-described three-step structure as shown in FIG. 6A.

Figure 7:
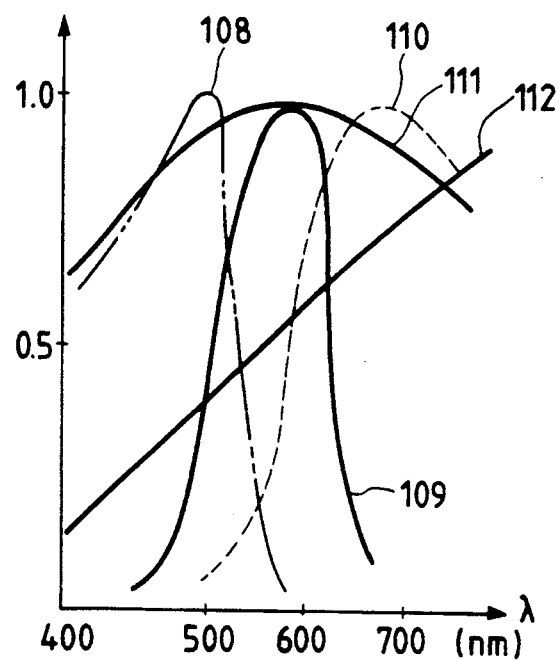
FIG. 7 shows the spectral sensitivity distributions of sensors.

This embodiment will be adversely affected in no way even if combined with the spectral sensitivity 111 of an ordinary CCD sensor, which does not have the wavelength selective filter characteristics shown in FIG. 7, or the spectral sensitivity 112 of illuminating means such as a halogen lamp, which is concerned with black body radiation.

By the use of the number of steps (n) of the staircase and the wavelength ratio (m) determined by the thickness of the grating and the 0-order peak wavelength, the peak wavelenghts of 0-order and ±1st-order diffracted lights can be approximately found on the basis of the following relational expressions:

$$\text{0-order peak wavelength} = \frac{2 h_1 \cdot \cos \theta_0}{(m - i) \cdot \Lambda_0}$$

$$\text{−1st-order peak wavelength} = \frac{2 h_1 \cdot \cos \theta_0}{(m - i - 1/n) \cdot \Lambda_0 - 1}$$

$$\text{−1st-order peak wavelength} = \frac{2 h_1 \cdot \cos \theta_0}{(m - i + 1/n) \cdot \Lambda_0 - 1}$$

where $h_1 = h_2$ (three steps) or $h_1 = h_2 = h_3$ (four steps). $(i = 0, \pm 1, \pm 2, \ldots)$.

In the example shown in FIG. 6A, on the assumption that $h_1 = h_2 = 1113.7$ nm and $\theta_0 = 45°$, from $m = 3$, the 0-order peak wavelength is $\lambda_0 = 525$ nm, 393.8 nm, 787.5 nm, ..., the +1st-order peak wavelength is $\lambda_{-1} = 590.6$ nm, 429.5 nm, 945 nm, ..., and the −1st-order peak wavelength is $\lambda_{-1} = 472.5$ nm, 363.5 nm, 675 nm, ....

On the other hand, there is a wavelength λ which comes into existence at $$2 h_1 \cdot \cos \theta_0 = (m - i \pm m/n) \cdot \lambda$$

only when the number of steps n is four or more, and at this time, the spectral intensities of all of 0-order and ±1st-order diffracted lights become 0.

For example, for (n, m) = (4, 2), $h_1 = h_2 = h_3 = 742.46$ nm and $\theta_0 = 45°$ shown in FIG. 6B, the 0-order peak wavelength is $\lambda_0 = 525$ nm, 350 nm, 1050 nm, the +1st-order peak wavelength is $\lambda_{-1} = 600$ nm, 381.8 nm, 1400 nm, and the −1st-order peak wavelength is $\lambda_{-1} = 466.7$ nm, 323.1 nm, 840 nm, ..., and for $\lambda = 420$ nm, 700 nm, ..., the 0-order and ±1st-order peak wavelengths are all 0. It is apparent that by the use of such characteristic, the mixing of the −1st-order sideband wave and the +1st-order sideband wave with the +1st-order component (R) and the −1st-order component (B), respectively, can be obviated.

Likewise, in FIG. 6C, even for (n, m) = (5, 2), $h_1 = h_2 = h_3 = h_4 = 742.46$ nm and $\theta_0 = 45°$, the 0-order and ±1st-order peak wavelengths all become 0 at $\lambda = 437.5$ nm, 656.3 nm, .... The effect is similar to that in the case of the above-described four steps. From what has been described above, it will be seen that by making the number of steps in the staircase structure of the reflection type one-dimensional brazed diffraction grating four or more, a good and inexpensive color image reading apparatus can be provided without the wavelength selective filter characteristics (R, G and B) being added to the three-line sensor, which is a light receiving element. Here, each position of the three-line sensor, inclusive of the diffraction effect, is conjugate with a certain position on the surface of the original which is spectrally separated and therefore, of course, a redundant memory or the like for interpolating the space between the lines is unnecessary.

Figure 9:
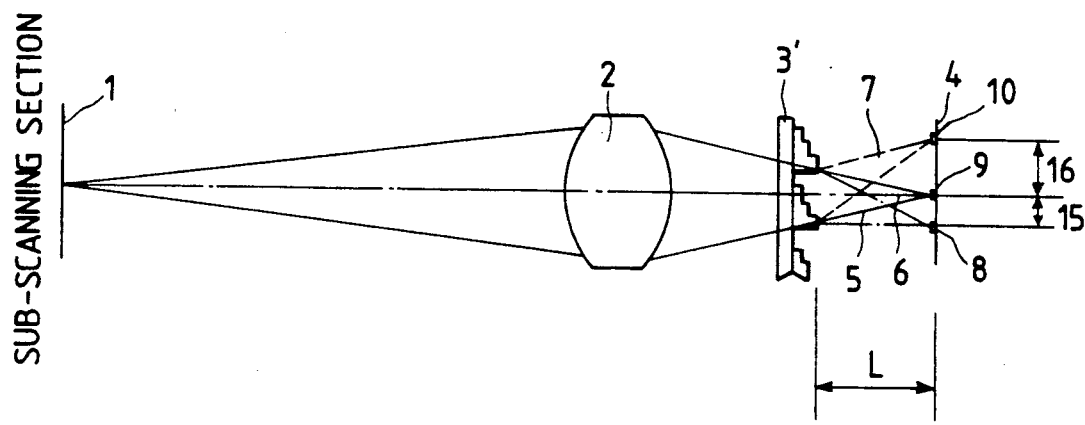
FIG. 9 is a schematic cross-sectional view for illustraing a second embodiment of the color image reading apparatus of the present invention.

FIG. 9 shows a second embodiment of the color image reading apparatus of the present invention. In the first embodiment, the reflection type one-dimensional brazed diffraction grating 3 is used to realize the three-color separating effect, whereas in the present embodiment, a similar effect is obtained by the use of a transmission type one-dimensional brazed diffraction grating of four-step structure. Reference numerals similar to those in FIG. 5 designate functionally similar members and similar diffracted lights. As shown in FIG. 9, a transmission type one-dimensional brazed diffraction grating 3' of four-step structure is disposed perpendicularly to the optic axis of the optical system, thereby providing a reading optical system which permits easier disposition of the optic axis system. In this case, the sensor surfaces of the line sensors are disposed parallel to the sub-scanning direction. However, where for example, a spectral intensity distribution similar to that of FIG. 6B is to be obtained at this time, if from the relation that $(n\lambda - 1) \cdot h = m \cdot \lambda_0$, the refractive index nλ of the grating medium is $n\lambda \approx 1.5$, the thicknesses $h_1$, $h_2$ and $h_3$ of the grating need be $h_1 = h_2 = h_3 = 2100$ nm at $m = 2$ and $\lambda_0 = 525$ nm, and this is about 2.8 times as great as the thicknesses in the case of the reflection type. However, as a feature of the diffraction grating of this type, it is easy to make a unitary type element serving also as a dust-proof cover glass for the three-line sensor by setting a greater angle of diffraction or the like.

In the above-described transmission type one-dimensional brazed diffraction grating of four-step structure, the thickness of a dielectric material plate is repetitively varied to four stages in a staircase-like fashion.

Figure 10:
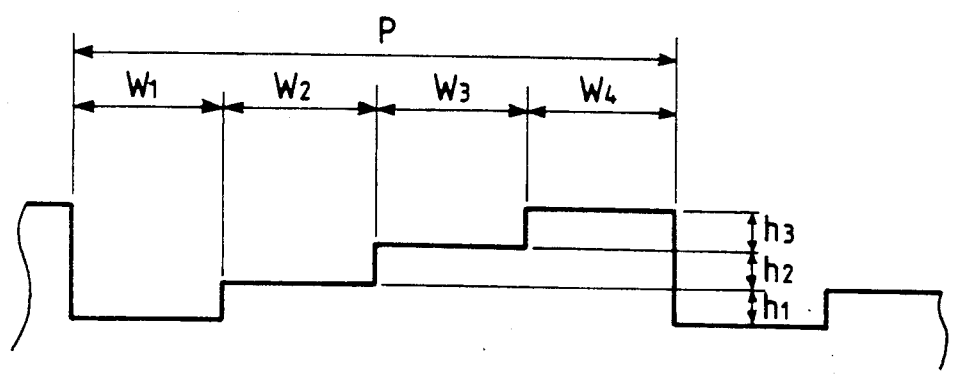
FIG. 10 illustrates the cross-section of the brazed diffraction grating of the present invention.

In the first and second embodiments, the grating thickness h and each grating step width W of the staircase structure of the diffraction grating in the sub-scanning cross-section including the direction in which the light from the object is color-resolved have all been dealt with as being uniform. A diffraction grating in which these parameters are varied will now be described with reference to a cross-sectional view of the diffraction grating shown in FIG. 10. In the present embodiment, these parameters are made to depart from all the above-mentioned uniform values, thereby providing a one-dimensional brazed diffraction grating which is smaller in noise light component and which can accomplish spectral separation.

Figure 11A:
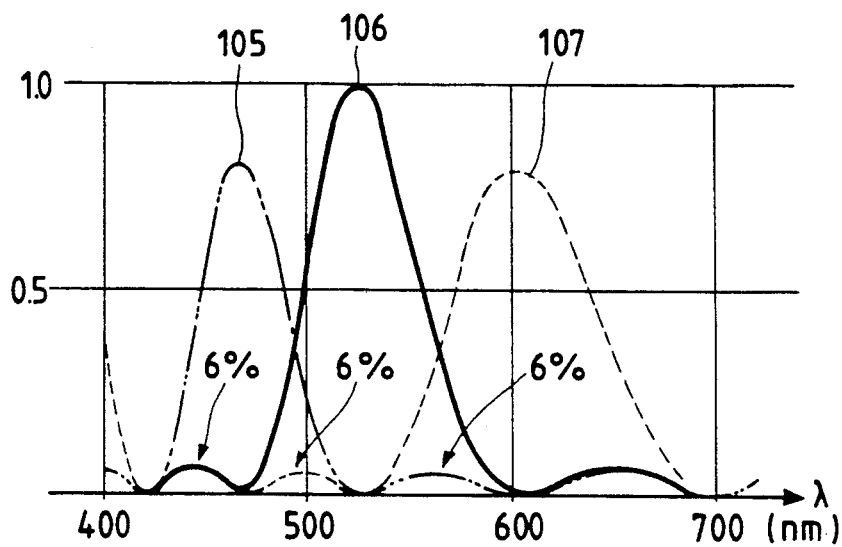
FIGS. 11A and 11B are spectral intensity distribution graphs illustrating the effect of the embodiment.
Figure 11B:
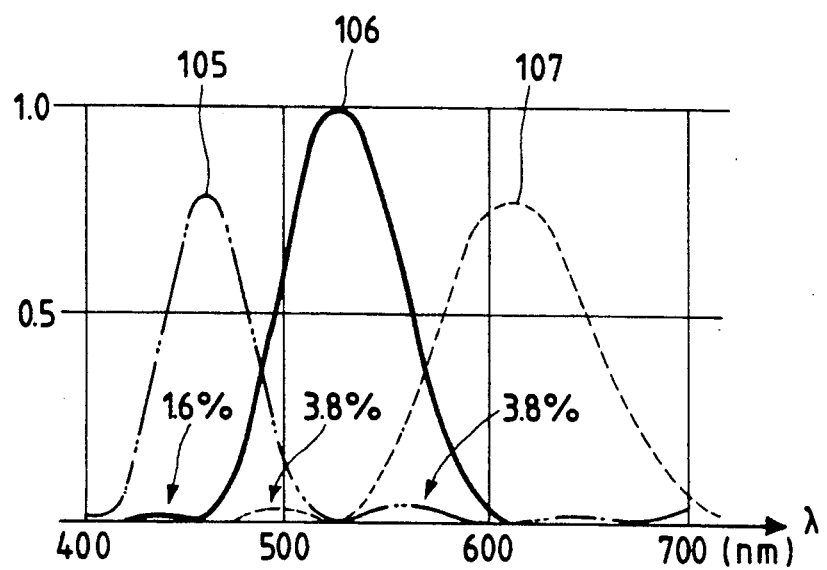

As an example, spectral intensity distributions of respective orders in a case where in a four-step reflection type 1st-order brazed diffraction grating, each grating step thickness $h_1=h_2=h_3=749.5$ nm and each step width $W_1=W_2=W_3=W_4=45$ μm and the angle of incidence $\theta_0=45°$ are shown in FIG. 11A. In the figure, in intensity curves 105, 106 and 107 corresponding to −1st-order (B), 0-order (G) and +1st-order (R), respectively, small peak portions (portions indicated by arrows), which may more or less make noise light when the filter characteristics are not added to the line sensors, exist between respective peak wavelengths, as shown, and in this example, such small peak portions exist by the order of 6% of each-order peak intensity. In order to reduce this relatively, it would occur to mind to have the grating widths $W_1$-$W_4$ of the respective steps not uniform, but non-uniform. This will provide the effect of reducing the diffraction efficiency of this noise component band greatly, even if the contribution of each step concerned in diffraction is made asymmetrical and the diffraction efficiency in the peak wavelengths exhibits a slight reduction. For this reason, it is desirable to give $W_1+W_2=W_3+W_4$ and $W_1=W_4$ and $W_2=W_3$, thereby partially leaving the symmetry in the contribution of interference and diffraction. So, a diffraction grating in which, in the above-described embodiment, $W_1=W_4=35$ μm and $W_2=W_3=55$ μm, that is, $W_1=W_4<W_2=W_3$ and $W_1+W_2=W_3+W_4=90$ μm, is shown in the spectral intensities of FIG. 11B. As shown there, the above-mentioned noise light component is 3.8% at greatest, a reduction to about $\frac{2}{3}$ or less as compared with the case of FIG. 11A. On the other hand, the reduction in diffraction efficiency in the peak wavelengths is of the order of 2%, and in the present embodiment, the diffraction efficiency in ±1st-order peak wavelengths is about 78%, which is sufficient.

As $W_1=W_4$ is made smaller, the wavelength of spectral intensity 0 of the diffracted light becomes null, while the peak wavelengths give rise to a remarkable reduction in the diffraction efficiency, and this is generally not advisable.

Another method of reducing the small peak components of the diffracted light components of respective orders described in the third embodiment will be shown below. This makes the grating thickness of each step depart from a uniform fixed value. It also accomplishes a reduction in the noise light component in the same manner as in the third embodiment, and improves the spectral separating performance. Again in this case, there is a high possibility of the diffraction efficiency at the vicinity of the peak wavelengths being remarkably reduced if symmetry is all removed, and in the present embodiment, the small peak noise light component existing in the component widths of the −1st-order (B) component and the +1st-order component (R), in which $h_1=h_3$ and $h_1+h_2+h_3$ is equal to that shown in the first embodiment, can have a well-balanced reduction to a sufficiently small level.

Figure 8:
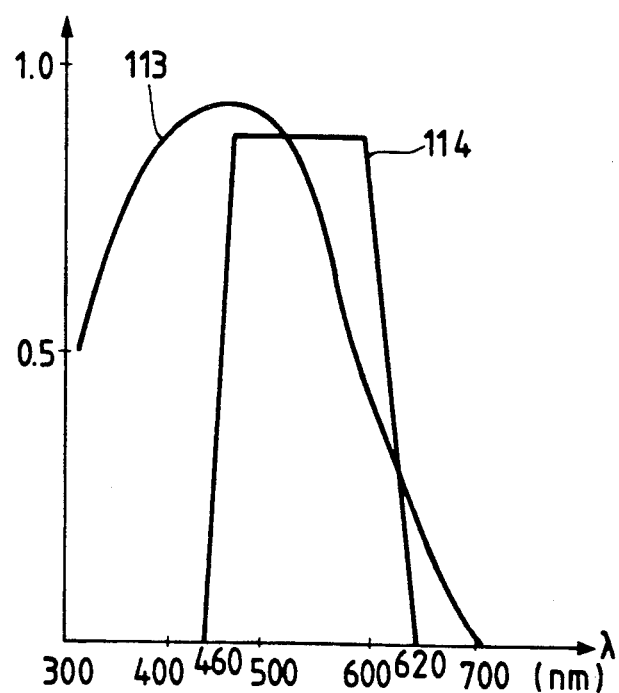
FIG. 8 shows the characteristic of a filter used in the embodiment.
Figure 12A:
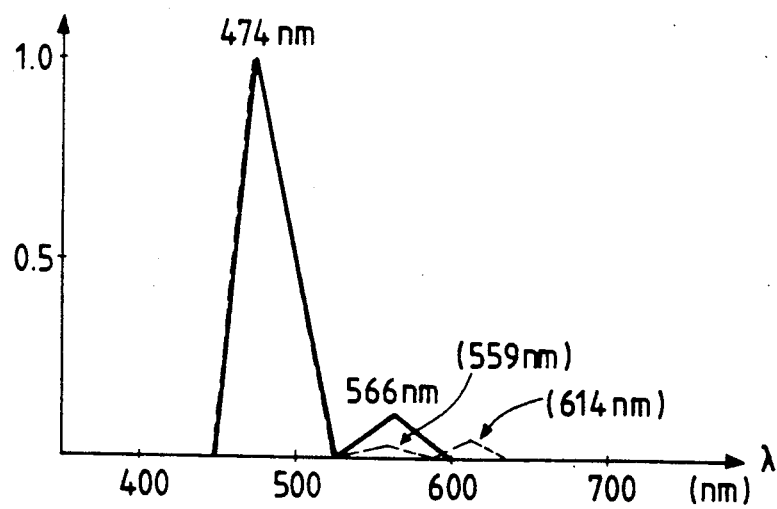
FIGS. 12A, 12B and 12C are spectral intensity distribution graphs illustrating the effect of the embodiment.
Figure 12B:
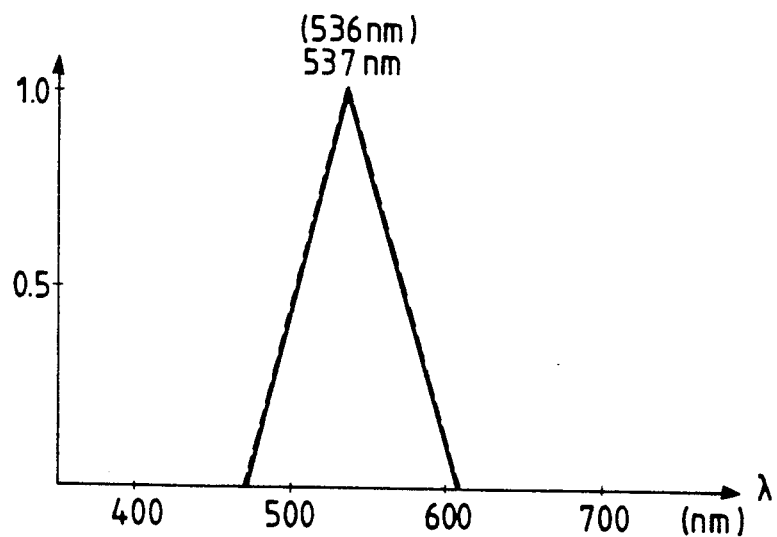
Figure 12C:
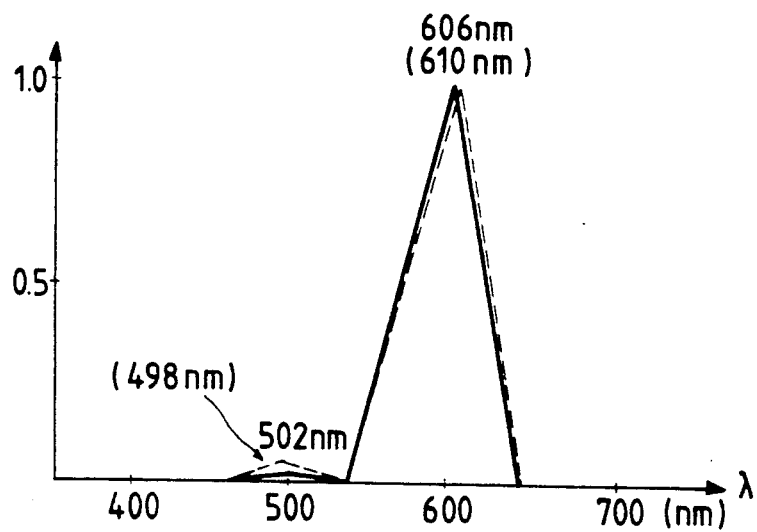

FIG. 12 graphically shows respective spectral intensities in a grating structure wherein $h_1=h_3=729.5$ nm and $h_2=769.5$ nm, that is, $h_1=h_3<h_2$, is given as specific numerical values and the method of the third embodiment (the method of making the grating widths of the respective steps non-uniform) is also included. FIG. 12A shows the −1st-order (B) component, FIG. 12B shows the 0-order (G) component, and FIG. 12C shows the +1st-order (R) component. In each of these figures, the solid line indicates the spectral intensity distribution of what is shown in the first embodiment, and the broken line indicates the spectral intensity distribution in the grating structure having the methods of the third and fourth embodiments. These spectral intensity distributions include the sensor spectral sensitivity 111 (common to three lines) and the halogen light spectral intensity 112 shown in FIG. 7, and the spectral distribution characteristics 113 and 114 of the infrared cut filter and the interference band-pass filter, respectively, shown in FIG. 8.

As described above, the present invention is a color image reading apparatus in which a color image on the surface of an original is illuminated by illuminating means and this color image is projected by a projection optical system onto detecting means comprising a monolithic three-line sensor having three line sensors disposed on one and the same substrate and a one-dimensional brazed diffraction grating of staircase structure, for color-resolving a light beam into three color lights in a direction orthogonal to the direction of arrangement of the line sensors when the color image is read by the detecting means and directing the color lights to the respective line sensors, is disposed between the projection optical system and the detecting means, and wherein the staircase structure of said one-dimensional brazed diffraction grating is constructed of four or more steps.

As described above, according to the present invention, in an apparatus for color-reading image information by line scanning, for example, a monolithic three-line sensor is disposed along the line scanning direction (the sub-scanning cross-sectional direction) and a one-dimensional brazed diffraction grating, having a staircase structure of four or more steps for color resolution and separation, is placed between an imaging optical system and the surface of the sensor, whereby the three line sensors do not have added thereto the wavelength selective filter characteristic regarded as indispensable to an ordinary color-reading sensor, and are enabled to resolve a light beam into three colors and separate and image the light beams to thereby accomplish color reading, and also good color image reading is realized without the use of a redundant line memory for inter-line interpolation, which is regarded as necessary for ordinary three-line color sensor reading. Also, the present invention eliminates in principle any color misregistration attributable to mechanical trembling or the like consequent upon scan-reading which tends to occur during ordinary three-line reading.

I claim:

1. An image reading apparatus comprising:
   a plural-line sensor comprising a plurality of one-dimensional sensor arrays disposed on one and the same substrate;
   an imaging optical system for imaging an object on said plural-line sensor; and
   a brazed diffraction grating, having a staircase structure with a number of steps, disposed in an optical path between said imaging optical system and said plural-line sensor for color-resolving a light beam from said object into a plurality of lights and directing said color-resolved lights to said sensor arrays corresponding thereto, wherein the number of steps of the staircase structure of said diffraction grating is four or more.

2. An image reading apparatus according to claim 1, wherein said plural-line sensor comprises a plural-line sensor in which said one-dimensional sensor arrays are disposed on a plurality of lines with finite distances therebetween in a direction orthogonal to the array direction of said sensor arrays.

3. An image reading apparatus according to claim 1, wherein said brazed diffraction grating color-resolves the light beam from said object into a plurality of lights in a direction orthogonal to the direction of said sensor arrays.

4. An image reading apparatus according to claim 1, wherein a wavelength selective filter characteristic is not added to the sensor surface of said plural-line sensor.

5. An image reading apparatus according-to claim 2, wherein said object is scanned in the sub-scanning direction, which is a direction orthogonal to the array direction of said sensor arrays.

6. An image reading apparatus according to claim 5, wherein the sensor surface of said plural-line sensor is disposed parallel to the sub-scanning direction.

7. An image reading apparatus according to claim 1, wherein said brazed diffraction grating comprises a one-dimensional brazed diffraction grating.

8. An image reading apparatus according to claim 1, wherein grating thickness of the staircase structure of said brazed diffraction grating is not uniform for each step of the grating.

9. An image reading apparatus according to claim 1, wherein grating width of the staircase structure of said brazed diffraction grating is not uniform for each step of the grating.

10. An image reading apparatus comprising:
a plural-line sensor comprising a plurality of one-dimensional sensor arrays disposed on the same substrate;
an imaging optical system for imaging an object on said plural-line sensor; and
a brazed diffraction grating, having a staircase structure with a number of steps, disposed in an optical path between said imaging optical system and said plural-line sensor, for color-separating a light from said object into a plurality of lights, wherein the number of steps of the staircase structure of said diffraction grating is four or more.

11. An image reading apparatus according to claim 10, wherein said plural-line sensor comprises a plural-line sensor in which said one-dimensional sensor arrays are disposed on a plurality of lines with finite distances therebetween in a direction orthogonal to the array direction of said sensor arrays.

12. An image reading apparatus according to claim 10, wherein said brazed diffraction grating color-separates the light from said object into a plurality of lights in a direction orthogonal to the direction of said sensor arrays.

13. An image reading apparatus according to claim 10, wherein a wavelength selective filter characteristic is not added to the sensor surface of said plural-line sensor.

14. An image reading apparatus according to claim 11, wherein said object is scanned in the sub-scanning direction, which is a direction orthogonal to the array direction of said sensor arrays.

15. An image reading apparatus according to claim 14, wherein the sensor surface of said plural-line sensor is disposed parallel to the sub-scanning direction.

16. An image reading apparatus according to claim 10, wherein said brazed diffraction grating comprises a one-dimensional brazed diffraction grating.

17. An image reading apparatus according to claim 10, wherein grating thickness of the staircase structure of said brazed diffraction grating is not uniform for each step of the grating.

18. An image reading apparatus according to claim 10, wherein grating width of the staircase structure of said brazed diffraction grating is not uniform for each step of the grating.

* * * * *

UNITED STATES PATENT AND TRADEMARK OFFICE
CERTIFICATE OF CORRECTION

PATENT NO. : 5,177,349
DATED : January 5, 1993
INVENTOR(S) : SETANI

It is certified that error appears in the above-indentified patent and that said Letters Patent is hereby corrected as shown below:

COLUMN 7

Line 7, "noise light" should read --light noise--.
    Line 44, "noise light" should read --light noise--.
    Line 54, "embodiment," should read --embodiment--.

COLUMN 9

Line 10, "according-to" should read --according to--.

Signed and Sealed this

First Day of February, 1994

Attest:

Attesting Officer

BRUCE LEHMAN

Commissioner of Patents and Trademarks